United States Patent [19]

Shaw et al.

[11] 4,086,203
[45] Apr. 25, 1978

[54] FIBERS SIZED WITH POLYESTER AND POLYURETHANE PRECURSORS

[75] Inventors: Bryan Shaw; Valerie Lawton; James McAinsh, all of Runcorn, England

[73] Assignee: Imperial Chemical Industries Limited, London, England

[21] Appl. No.: 570,747

[22] Filed: Apr. 23, 1975

Related U.S. Application Data

[63] Continuation of Ser. No. 304,952, Nov. 9, 1972, abandoned.

[30] Foreign Application Priority Data

Nov. 12, 1971 United Kingdom ............... 52595/71

[51] Int. Cl.$^2$ ................................................ C08K 9/04
[52] U.S. Cl. ................................. 260/40 R; 260/37 N; 260/40 TN; 260/42.16; 428/375; 428/392
[58] Field of Search ............ 260/40 TN, 42.16, 40 R, 260/37 N; 428/375, 392; 427/385

[56] References Cited

U.S. PATENT DOCUMENTS

| | | |
|---|---|---|
| 2,780,612 | 2/1957 | Te Grotenhuis .................. 260/42.16 |
| 3,066,383 | 12/1962 | Marzocchi et al. ............. 428/392 X |
| 3,234,042 | 2/1966 | Marzocchi et al. .................. 117/126 |
| 3,453,652 | 7/1969 | Marzocchi ....................... 428/392 X |
| 3,471,439 | 10/1969 | Bixler et al. ........................ 260/42.16 |
| 3,578,728 | 5/1971 | Ehrhart et al. ............. 260/40 TN X |
| 3,886,229 | 5/1975 | Hutchinson et al. ....... 260/40 TN X |

*Primary Examiner*—Sandra M. Person
*Attorney, Agent, or Firm*—Cushman, Darby & Cushman

[57] ABSTRACT

A fibrous product comprises a core component which may be inorganic or organic, and a sheath component, said sheath component being a composite polymeric material comprising polyurethane and polyester and/or vinyl polymer. The sheath component may be applied to the core in the form of a gel polymerizate comprising polyurethane precursors or a polyurethane together with a polyester resin precursor comprising an ethylenically unsaturated polyester and an ethylenically unsaturated monomer.

9 Claims, No Drawings

FIBERS SIZED WITH POLYESTER AND POLYURETHANE PRECURSORS

This is a continuation of Ser. No. 304,952 filed Nov. 9, 1972, and now abandoned.

This invention relates to fibrous products and to derivatives thereof.

The invention provides fibrous products comprising a core and a sheath component, said sheath component being a composite polymeric material comprising polyurethane and polyester and/or vinyl polymer.

The core component of the fiber of the invention may be crystalline or non-crystalline inorganic material for example any of the glass (e.g. so-called A, E or S glass), high modulus glass/ceramic fiber, asbestos or carbon fiber, or it may be organic, for example polyester (e.g. polyethylene terepthalate) or polyamide (e.g. Nylon).

The sheath component may comprise a gel polymerizate of a mixture of (a) from 5% to 95% by weight of the precursors of a polyurethane comprising at least one polyfunctional compound containing groups reactive with isocyanate groups and at least one polyisocyanate, and (b) from 95% to 5% by weight of a polyester resin precursor comprising
  (i) at least one ethylenically unsaturated polyester, and
  (ii) at least one polymerisable ethylenically unsaturated monomer.

The mixture may be fully reacted (i.e. the polyurethane precursors reacted together and with polyester and the polyester copolymerised with the monomer) or it may be partially reacted (i.e. the polyurethane precursors reacted together and with the polyester, but with the polyester and monomer substantially uncopolymerised.

Preferably the proportions of (a) and (b) are in the range 30:70 to 70:30.

The polyfunctional compound may be difunctional or of higher functionality, and the polyisocyanate similarly may be difunctional or of higher functionality.

The polymerizable ethylenically unsaturated monomer is preferably a vinyl monomer having a double bound in a terminal group.

By vinyl monomer we mean a monomer containing at least one ethylenically unsaturated group which will react with the ethylenically unsaturated groups in the polyester, and within the scope of this definition we include monomers containing one or more alkyl groups.

The polyisocyanate preferably comprises at least one component of the structure

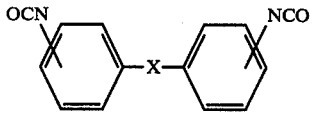

where X is a divalent, radical. X may be, for example —O— or —SO$_2$—, especially the 4:4'diphenyl derivatives. Alternatively X may be, for example —(CH$_2$)$_n$— where $n$ is a whole number in the range 1 to 3.

If desired one, or more of the hydrogen atoms in the radical —(CH$_2$)$_n$— may be replaced by hydrocarbyl groups including for example, alkyl groups e.g. alkyl groups having from 1 to 5 carbon atoms. A preferred polyisocyanate is 4:4'-diphenylmethane diisocyanate.

The Tg of the polyruethane which may be formed from (a) preferably is at least 25° C.

Examples of suitable polyfunctional compounds, polyisocyanates, vinyl monomers and polyesters are disclosed in our British Pat. specifications Nos. 1279673 and 1272984, the disclosure of which specifications are included herein by this reference. The components disclosed in the aforementioned patents may be employed in the present invention in any combination.

The polyfunctional compound and the polyester contain "isocyanate reactive" groups (i.e. groups which react with NCO groups in the polyisocyanate) e.g. OH and COOH, and it is preferable, although not essential, that the ratio of NCO$\beta$:NCO reactive groups is from 0.8:1 to 1.2:1, and more preferably from 0.9:1 to 1.1:1.

According to the invention, therefore, there is provided a fibrous product comprising as a sheath to a core, a polymeric composition as disclosed in any of the aforementioned specifications, said composition hereinafter to be referred to for convenience as PU/PE resin.

Application of the PU/PE resin to the core may involve polymerization of one component of the resin, ie. the polyurethane, dissolution of the part cured resin in a suitable solvent, coating of the solution of to the fiber core and subsequent removal of the solvent by evaporation. An alternative method is to apply the resin precursors to the fiber and to the effect cure of the resin in situ. This latter technique is employed particularly when cross-linkable polyurethane precursors are involved.

It has been mentioned above that the mixture on the core may be only partially polymerized, the polyester and the monomer remaining incompletely polymerized, and in such a case it will be appreciated that the invention provides a fibrous product comprising a fiber core coated with a part-cured PU/PE resin system such that completion of cure may be effected subsequently. Such a part-cured PU/PE resin system may comprise a cured polyurethane component dispersed in an incompletely cured vinyl and/or polyester component. Such a fibrous product may be shaped to a desired configuration and further cure subsequently effected. To this end we have found it advantageous to coat the fiber core with uncured or part-cured resin component and to form the fiber into an aggregate, conveniently a tape, e.g. by winding it on to a former. Uncured resin may be part-cured after formation of the aggregate. Methods of part-curing the resin are described in the aforementioned patent specifications and the process is exemplified below.

In another embodiment the sheath component is formed by applying to the core component a composition comprising at least one vinyl monomer and the precursors of a cross-linked polyurethane, and polymerising the so applied sheath components under conditions such that gelation of the polyurethane is substantially completed before polymerization of the vinyl monomer is allowed to proceed to the extent that the vinyl monomer so produced forms a separate phase. Such compositions are described in the specification of our British Pat. No. 1,239,701. Coating of the fiber core with the sheath material preferably occurs immediately after formation of the fiber, as soon as its physical condition is such that coating is feasible. This is particularly preferred since the likelihood of contamination of the surface of the fiber with dust, water vapour etc., which are usually considered to impair adhesion of the surface to coatings, is thereby minimised.

In one example of the process of the invention, E-glass monofilament was spun from a platinum bushing in the conventional fashion, after careful precautions to clean the glass from dirt and moisture.

Application of the resin to the glass monofilament core so formed was by any of the variety of means, e.g. by spray from a syringe, by passing it through a slit crucible or by contacting the fibre with the cylindical face of a roller carrying a layer of resin. Cooling of such a spun fiber is, because of the small size of the fiber - preferably within the range 0.001 mm to 1 mm - usually quite rapid, so that coating can take place within a short distance from the bushing e.g. of the order of 100 cm.

It may be desirable to pass the coated fiber through an appropriately heated zone either to effect part cure of resin precursor or to drive off solvent from the coating, although slower evaporation or cure in unheated conditions may be appropriate, after which the fibre is taken up in a convenient manner, usually by winding the fiber on to a large diameter drum geared to produce displacement of successive turns of the fiber, so that a continuous tape is obtained which may subsequently be removed from the drum and used as a prepreg, to be fully cured after further shaping and, possibly, compression. Further heating of the tape may be effected if desired to effect cure or to drive off solvent. As an alternative to the above described method of fiber take-up the fiber may be wound using a transversely driven take-up bobbin to form a continuous wound tape, chopped to form a mouldable chopped composite material, or deposited on to a moving platform so that a layer is built up.

It will be appreciated that while catalyst systems chosen may very conveniently be of the heat curing type, other cure systems, which may involve chemical cure, or visible light or other radiation (e.g. U.V.) cure techniques, will be within the scope of the concept of invention.

Fibers of the invention may be moulded as pregregs either with or without (e.g. where there is residual polymerizable material in the sheath) the addition of further resin. It is found that voids due to incomplete wetting of the fibers, such as are commonly encountered when conventional resin solution fiber reinforcement impregnation techniques are employed, may be obviated by the process of the invention.

The PU/PE sheathing we have found, forms a useful size for many purposes, in particular for improving adhesion of the fiber to many polymers for example in the preparation of glass-reinforced composites, particularly, glass/polyester particularly composites and according to another aspect of the example, therefore the invention provides a fiber coated with a polymeric size of chemical composition as hereinbefore described.

The thickness of the polymeric sheath on the fiber obtained according to the invention can obviously vary between wide limits. Where the sheath is present primarily as a size it may only be a few microns thick, while for the preparation of prepregs a much thicker coating, of the order of tenths of a millimeter often, will be desirable. To attain the desired sheath thickness it may be necessary to use a plurality, usually two, of coating steps.

The invention is illustrated by the following examples:-

EXAMPLE 1

E-glass fiber of diameter 0.1 mm was spun from a platinum bushing and coated, immediately after cooling to ambient, from a roller surface, with a solution obtained as follows:-

1 gm of Topanol A (a commercially available inhibitor) was added to 76 gm. of Crystic 199 (a commercially available unsaturated polyester comprising 38% by weight of styrene and 62% by weight of an unsaturated polyester) and the mixture heated to about 50° C. 32 gm. of 4:4'-diphenylmethane diisocyanate at 70° C. were added and the mixture stirred until a clear mix was obtained. 0.5 gm tetiary butyl peroctoate were then added to the clear mixture followed by 44 gm. of oxypropylated bisphenol A (sold commercially as BP2 resin by B.P. Chemicals Ltd.) After further stirring the mixture was degassed by applying a vacuum of about 30 cm Hg. for 3 minutes and then cast to a film about 3 mm thick. After part curing for 16 hours at 20° C, 25 gm of the material were dissolved in 250 gm. methylene chloride.

The coated fiber was taken up on a reciprocating rotating bobbin and after an appropriate thickness had built up the composite was removed from the bobbin and left over night (16 hours) at ambient temperature, whereby surface drying of the composite occured.

The prepreg so obtained was then placed into a mould and cure of the prepreg completed by heating it in the mould at 120° C for 2 hours.

EXAMPLE 2

The following resin composition was formulated:-

| Crystic 199 | 130gm | (1) |
| --- | --- | --- |
| BP2 resin | 44.4gm | (2) |
| Polyisocyanate* | 25.6gm | (3) |
| t-butyl peroctoate | 1gm | (4) |
| Trigol/hydroginone | 6 drops | (5) |

(*a polyisocyanate having an isocyanate functionality of 2.7 to 2.8 and containing 4:4'-diphenylmethane diisocyanate).

The resin was prepared by mixing together (1), (3) and (5), (3) being heated to 70° C and (1) and (5) being at room temperature, adding (4), and then (2) at 40° C. The product was a viscous syrupy liquid and was dissolved immediately in dried methylene chloride to give a 40% solution. Glass fiber was then immersed in the solution, withdrawn and allowed to drain. The fiber was then collected to form a tape and allowed to stand to permit evaporation of the solvent and, after about 4 hours, partial cure of the resin. The tape was cut and pressed in a mould at 120° C for 2 hours. A transparent composite was obtained indicating good fiber welting.

EXAMPLE 3

Example 2 was repeated using carbon fibers (ex. Rolls Royce). The resulting composite showed good strength and rigidity.

EXAMPLE 4

Example 1 was repeated, except that the part cured resin was applied to the fiber in 10% solution in methyl ethylketone.

EXAMPLE 5

Example 1 was repeated, except that a chopped prepreg was obtained by passing the coated fiber through a stream of air at 40° C. to effect drying, the fiber subsequently being chopped into 2 cm lengths which were then compressed into a mould, where cure of the polymer was brought about by heat as described in Example 1.

EXAMPLE 6

Example 1 was repeated, except that the fiber was coated with an uncured mixture of PU/PE resin components, the mixture subsequently being part-cured on the fiber to form a prepreg which could be moulded subsequently.

EXAMPLE 7

The resin composition of Example 2 was deposited onto freshly extruded glass fiber in 10% solution in methylene chloride; the resulting thinly coated fiber was dried and used as a sized glass fiber component in conventional glass reinforced polyester moulding with excellent fiber/resin adhesion.

What we claim is:

1. A method of forming fiber reinforced composites comprising:
   (1) coating a fiber with a size which comprises (a) a mixture of from 5-95% by weight of a polyurethane or precursors thereof having at least one polyfunctional compound containing groups reactive with isocyanate groups and at least one polyisocyanate together with (b) from 95-5% by weight of a cross-linked polyester resin precursor comprising:
      (i) at least one ethylenically unsaturated polyester, and;
      (ii) at least one ethylenically unsaturated monomer copolymerizable with said unsaturated polyester;
   (2) partially or completely curing the size;
   (3) mixing the sized fiber with curable resin;
   (4) subjecting the mixture to a shaping operation during or after its preparation;
   (5) curing the resin and any incompletely cured size.

2. A method according to claim 1 in which the size coat is less than 0.1 mm thick.

3. A method according to claim 1 in which the molar proportion of groups reactive with isocyanate groups in the polyfunctional compound plus ethylenically unsaturated polyester to isocyanate groups in the polyisocyanate is in the range 0.8:1 to 1.2:1.

4. A method according to claim 3 in which the polyisocyanate comprises at least one compound of the structure

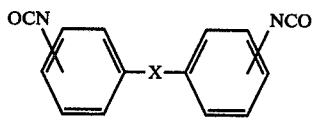

where X is a divalent radical.

5. A method according to claim 4 in which X is O, $SO_2$, or $-(CR^1R^2)-$ where $R^1$ and $R^2$ may be hydrogen or lower alkyl groups and $n$ is an integer from 1 to 3.

6. A method according to claim 5 in which the fiber is in continuous lengths.

7. A method according to claim 6 in which the fiber is glass or carbon.

8. A method according to claim 7 in which the fiber is glass and the size is applied to the glass within a short distance from where spun.

9. A method according to claim 1 in which the size is applied in solution.

* * * * *